June 21, 1949.  J. M. AUZIN  2,473,742
INFLATION INDICATOR FOR CATHETERS
Filed Dec. 28, 1944
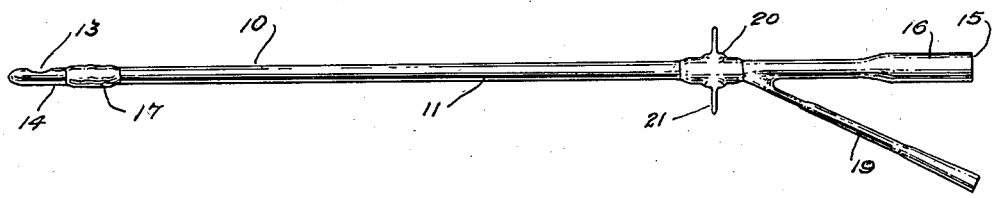
Fig. 1
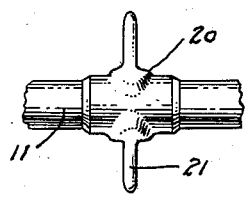  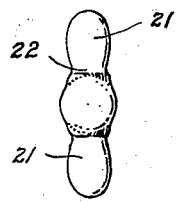  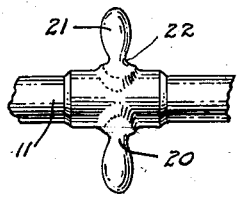
Fig. 2  Fig. 3  Fig. 4
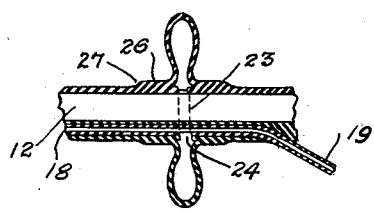  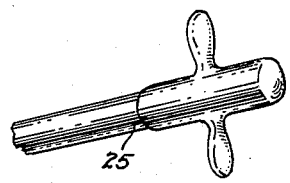
Fig. 5  Fig. 6
INVENTOR
John M. Auzin
BY Nathaniel Frucht
ATTORNEY Patented June 21, 1949

2,473,742

UNITED STATES PATENT OFFICE 2,473,742

INFLATION INDICATOR FOR CATHETERS

John M. Auzin, Warwick, R. I., assignor to Davol Rubber Company, a corporation of Rhode Island Application December 28, 1944, Serial No. 570,508

3 Claims. (Cl. 128—349)

The present invention relates to the manufacture of surgical appliances, and has particular reference to a novel construction for an inflatable balloon type catheter.

The principal object of the invention is to provide an inflatable balloon type catheter with an improved inflation indication device.

Another object of the invention is to provide an inflation inflatable balloon type catheter with an inflation indicator which extends radially outwardly from the body portion of the catheter.

Still another object of the invention is to provide an inflatable balloon type catheter with a plurality of inflation indicating elements which are circumferentially spaced about the body portion of the catheter.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a view showing an illustrative catheter construction embodying the invention;

Fig. 2 is an enlarged detail thereof showing the preferred form of inflation indicating device, in deflated condition;

Fig. 3 is a side view of Fig. 2;

Fig. 4 is a view similar to Fig. 2, showing the indicator device in inflated condition;

Fig. 5 is a vertical section through Fig. 4; and

Fig. 6 is a detail perspective of the mold for forming the indicator device.

Catheters of the balloon type are surgically applied by positioning the balloon within a body cavity and then inflating the balloon to retain the catheter in place. Since the balloon is usually inflated by filling with a fluid under pressure, serious injury may result if the balloon becomes deflated during use, or leaks so that the inflating fluid enters the body cavity. There has heretofore been no way to determine whether the balloon is in inflated condition when in use, and it has therefore been found desirable to provide a catheter of the balloon type with an indicator to disclose the extent of inflation of the balloon.

I accomplish this advantageous result by providing the catheter with a small inflatable indicator device positioned adjacent the open end of the catheter, which indicator device becomes inflated when the balloon is inflated, and remains inflated as long as the balloon remains inflated. When the balloon is deflated for any reason the indicator device also deflates, and I have provided a change in shape under such conditions which becomes immediately visually evident, and enables the doctor or nurse to take the necessary corrective measures at once.

Referring to the drawings, the catheter 10 has an elongated body portion 11 which is provided with a drainage passageway 12 therethrough which is in free communication with one or more drainage eyes 13 at the distal end 14 of the catheter and which has a drainage outlet 15 at the open end 16 of the catheter. An inflatable balloon section 17 is located at the distal end of the body portion of the catheter and is in free communication with an inflation conduit 18, preferably located in the wall of the catheter, the inflation conduit having an inlet connection 19 positioned at the open end of the catheter as illustrated in Fig. 1.

Mounted on the catheter body closely adjacent the inlet connection 19 and preferably in concentric relation to the catheter body is a small inflatable indicator device 20 which consists of a number of inflatable elements 21, preferably in the form of hollow propellers, which are spaced circumferentially around the body portion of the catheter at the inflation conduit inlet end. Each element is thus an inflatable bag, which has a narrow neck 22, the neck openings all communicating with an annular groove 23 in the outer wall of the body portion of the catheter, an opening 24 being provided between the inflation conduit and the annular groove. Each inflation element is thus in free, independent communication with the inflation conduit.

The thickness of the walls for the small indicator elements and their bag or propeller shape limits their expansion when the balloon is inflated so that the elements assume the shape shown in Fig. 4 when the balloon is fully expanded, thus providing a clear visual indication.

It is preferred to form the inflation indicator as a separate unit on a dipping mold 25, see Fig. 6, the mold being dipped in latex or similar rubber solution until a suitable thickness is built up. The dipped indicator device is then leached and cured and is removed from the mold and trimmed to leave two small flanges 26 which are preferably bevelled as indicated at 27, see Fig. 2.

The catheter body portion having been formed in the known manner from latex or the like, with the inflatable ballon and its inflation conduit in the wall of the body portion, the annular groove is formed while the latex is uncured, and the connecting opening 24 is cut or opened to communicate the inflation conduit with the groove. The indicator device is then mounted on the body portion as shown in Fig. 5, the parts then being cemented in place to join the indicator device integrally to the catheter body. If desired, the indicator device may be initially partially cured, and then fully cured after mounting or an additional dip in latex may be given after the assembly mounting.

When using the novel catheter, the doctor or surgeon inserts a syringe or other filling device into the open end of the inlet connection, and forces in a sufficient amount of fluid, usually about 50 cc., allowing a small amount, as 2 cc., for the indicator device, to inflate the balloon. This provides the balloon with the desired amount of expansion fluid and also expands the indicator device. The inlet connection is then manually gripped, the filling device withdrawn, and a retaining plug of standard type, not shown, inserted into the open end of the inlet connection to retain the pressure fluid in place. If the balloon breaks or leaks, the indicator device, which assumes the inflated shape shown in Fig. 4 when inflated, deflates and assumes the shape shown in Fig. 2, whereupon the doctor or nurse immediately knows that the balloon has become deflated.

While I have disclosed a specific embodiment of my invention, particularly designed for use with an inflatable catheter of the balloon type, it is obvious that the invention may be readily adapted for use with any device having a concealed or inaccessible expansible portion, and that the shape and size of the parts and their relative arrangement may be changed to suit constructions having different kinds of expansible portions and different requirements for visible indicators, without departing from the spirit and the scope of the invention as defined in the appended claims.

I claim:

1. A catheter construction comprising a body portion having a drainage passageway therethrough, the distal end of the body portion having a drainage eye communicating with the drainage passageway, an inflatable balloon on said body portion adjacent the distal end, an inflation conduit having an inlet connection and communicating with said balloon, and an inflatable indicator device mounted on the body portion at the other end thereof and having a plurality of inflatable elements each communicating with said inflation conduit, whereby said indicator device sections are inflated when the balloon is inflated and are deflated when the balloon is deflated.

2. A catheter construction comprising a body portion having a drainage passageway therethrough, the distal end of the body portion having a drainage eye communicating with the drainage passageway, an inflatable balloon on said body portion adjacent the distal end, an inflation conduit having an inlet connection and communicating with said balloon, and an inflatable indicator device mounted on the body portion at the other end thereof and having a plurality of inflatable elements, said body portion having an annular groove communicating with the inflation conduit and said elements each communicating with the groove, whereby said indicator device sections are inflated when the balloon is inflated and are deflated when the balloon is deflated, said elements extending radially from said body portion.

3. A surgical instrument comprising an elongated tubular body portion having an inflatable balloon at its distal end and which is adapted to be inserted in a body cavity for retention therein, an inflation conduit for supplying pressure fluid to the inflatable balloon, and a plurality of inflatable elements extending outwardly from said body portion in spaced circumferential relation and in free communication with said inflation conduit.

JOHN M. AUZIN.

REFERENCES CITED

The following references are of record in the file of this patent:

UNITED STATES PATENTS

| Number | Name | Date |
|---|---|---|
| 923,303 | Shults | June 1, 1909 |
| 1,922,084 | Gerow | Aug. 15, 1933 |
| 2,173,527 | Agayoff | Sept. 19, 1939 |

FOREIGN PATENTS

| Number | Country | Date |
|---|---|---|
| 61,028 | Austria | Sept. 10, 1913 |